US010127415B2

(12) United States Patent
Venture et al.

(10) Patent No.: US 10,127,415 B2
(45) Date of Patent: Nov. 13, 2018

(54) UHF RFID DEVICE FOR COMMUNICATING WITH UHF RFID TAGS WITHIN A SMALL CAVITY

(71) Applicant: NEOPOST TECHNOLOGIES, Bagneaux (FR)

(72) Inventors: Guy Venture, Senas (FR); Jean-Baptiste Pantaloni, Cavaillon (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 0 days.

(21) Appl. No.: 15/399,593

(22) Filed: Jan. 5, 2017

(65) Prior Publication Data

US 2017/0193258 A1    Jul. 6, 2017

(30) Foreign Application Priority Data

Jan. 6, 2016    (EP) ..................... 16305010

(51) Int. Cl.
*G06K 7/10*        (2006.01)
(52) U.S. Cl.
CPC ..... *G06K 7/10297* (2013.01); *G06K 7/10366* (2013.01)
(58) Field of Classification Search
CPC ........... G06K 7/10366; G06K 7/10009; G06K 7/10316; G06K 19/0723; G06K 7/10356; G06K 19/0717; G06K 7/0008
USPC ........................................................ 340/10.1
See application file for complete search history.

(56) References Cited

U.S. PATENT DOCUMENTS

| | | | |
|---|---|---|---|
| 4,836,352 | A | 6/1989 | Tateno et al. |
| 6,323,782 | B1 | 11/2001 | Stephens et al. |
| 6,707,381 | B1 | 3/2004 | Maloney |
| 6,895,241 | B2 | 5/2005 | Hara |
| 7,105,820 | B2 | 9/2006 | Federici et al. |
| 7,233,682 | B2 | 6/2007 | Levine |
| 7,372,262 | B2 | 5/2008 | Bertozzi et al. |
| 2002/0080030 | A1 | 6/2002 | Inomata |
| 2003/0138147 | A1 | 7/2003 | Ongkojoyo |

(Continued)

FOREIGN PATENT DOCUMENTS

| | | |
|---|---|---|
| CN | 2018833357 U | 5/2011 |
| EP | 1 587 401 B1 | 5/2010 |

(Continued)

OTHER PUBLICATIONS

European Search Report for EP Application No. 16305010, dated Jun. 15, 2016, 2 pages.

(Continued)

*Primary Examiner* — Mark Blouin
(74) *Attorney, Agent, or Firm* — Cozen O'Connor

(57) ABSTRACT

A UHF radiofrequency identification (RFID) device operating at an UHF wavelength for enabling communication of an UHF RFID reader with UHF RFID tags positioned within a cavity having an internal volume with a largest dimension that is below twice said UHF wavelength. The device comprises a wire wave guide having an entry extremity and at least one exit extremity and positioned within said at least one cavity above a ground surface, wherein said entry extremity is fed by said UHF RFID reader and said at least one exit extremity is connected to said ground surface via a load.

14 Claims, 3 Drawing Sheets

(56) References Cited

U.S. PATENT DOCUMENTS

| | | |
|---|---|---|
| 2004/0076544 A1 | 4/2004 | Dao |
| 2005/0068178 A1 | 3/2005 | Lee et al. |
| 2005/0264422 A1 | 12/2005 | Watanabe et al. |
| 2006/0043298 A1 | 3/2006 | Kawase et al. |
| 2006/0152339 A1 | 7/2006 | Mercier et al. |
| 2009/0119232 A1 | 5/2009 | Mercier et al. |
| 2009/0285353 A1 | 11/2009 | Ellenbogen et al. |
| 2011/0174551 A1 | 7/2011 | Lucas et al. |
| 2012/0194043 A1 | 8/2012 | Turner et al. |
| 2012/0211397 A1* | 8/2012 | Kilian .................. G06K 7/0008 206/719 |
| 2012/0326840 A1 | 12/2012 | Frankenberg et al. |
| 2013/0119129 A1 | 5/2013 | Amdahl et al. |
| 2013/0248425 A1 | 9/2013 | Kunnen |
| 2014/0035721 A1 | 2/2014 | Heppe et al. |
| 2015/0077221 A1 | 3/2015 | Peters et al. |
| 2015/0112887 A1 | 4/2015 | Camp |
| 2015/0193732 A1 | 7/2015 | Bouzit-Benbernou |
| 2015/0193733 A1 | 7/2015 | Bouzit-Benbernou |
| 2016/0294601 A1* | 10/2016 | Frederick ............... H04L 27/367 |
| 2017/0220828 A1* | 8/2017 | Venture .................. G06K 7/084 |

FOREIGN PATENT DOCUMENTS

| | | |
|---|---|---|
| FR | 2 851 360 A1 | 8/2004 |
| WO | 2006/050412 A1 | 5/2006 |
| WO | 2013/170316 A1 | 11/2013 |

OTHER PUBLICATIONS

Extended European Search Report, dated Jul. 20, 2017, for European Application No. 17305016.2-1806, 6 pages.

Extended European Search Report, dated Jun. 23, 2016, for European Application No. 16305010.7-1806, 6 pages.

Extended European Search Report, dated Mar. 28, 2014, for European Application No. 14305011.0-1953, 8 pages.

Extended European Search Report, dated Nov. 28, 2014, for European Application No. 14305012.8-1953, 9 pages.

Extended European Search Report, dated Oct. 15, 2014, for European Application No. 14305012.8-1953, 9 pages.

Partial European Search Report, dated Apr. 11, 2014, for European Application No. 14305012.8-1953, 6 pages.

Venture et al., "Automated Autovalidating Locker System," U.S. Appl. No. 15/863,633, filed Jan. 5, 2018, 43 pages.

* cited by examiner

UHF RFID DEVICE FOR COMMUNICATING WITH UHF RFID TAGS WITHIN A SMALL CAVITY

FIELD OF THE INVENTION

The present invention relates to the identification and tracking of items and more particularly to radio frequency identification data (RFID) systems designed to operate within a toolbox and more generally within a small cavity.

PRIOR ART

Today's business practices often require that items be traced during production and maintenance. Generally, an identification data (ID) device attached to each item is required. For productivity purposes, such an ID device needs to be read remotely and automatically by electronic readers. Automation reduces errors in information capture and allows for more accurate and more regular inventory management. This requires ID devices, which can communicate.

Radio frequency identification (RFID) is a preferred solution as radio frequency communication allows a diffuse transmission and is tolerant to RFID devices being hidden, as opposed to optical solutions, which are more directional and quite intolerant to blocking bodies lying in the transmission path. The use of RFID tags is an efficient and economical method for systems for tracking and tracing items within an organization. Producers can check the location of items, in real time, by remotely accessing the data being transmitted by RFID tags attached to those items. Therefore, RFID tags are widely used for the identification and the tracking of items, particularly for items in a shop or a warehouse environment.

Such RFID systems can be used for tracking and tracing tools and can provide the following functions: detect the input or output of tools in or from the toolbox, ensure that the tools required for a particular maintenance intervention are effectively in the toolbox, inventory of each particular toolbox and globally of all the toolboxes, historic for the tool management, establish links between the tools and the personnel using them. A RFID system should in particular allow verifying the content of the toolboxes used within the organization.

Toolboxes and tools are typically used for example when maintenance personnel go on missions to troubleshoot systems. Tools tracking and tracing is beneficial not only for inventory purpose of the tools, but also for ensuring that the tools required for a particular maintenance intervention are effectively in the toolbox and have not been left in the field. General benefits of tools tracking and tracing are knowledge of the tools flow within the organization, fast, reliable and immediately exploitable (real-time) tool identification and inventory, optimization of the usage of the tools for MRO (Maintenance Repair Operations) and productivity and profitability improvement for MRO.

A standard UHF RFID system comprises a reader and an antenna, and detects RFID tags within the volume covered by the radiative electromagnetic field generated by the antenna. When the toolbox, whose tools are to be detected, is within this volume, the tools RFID tags can be detected. However, any RFID tags in the vicinity outside the toolbox may also be detected, which would induce erroneous detection results. Additionally, toolboxes are generally made of electrically conductive materials—they are typically metallic. The radio frequency signals, which must be exchanged between the RFID system and the tag, cannot go through the conductive wall of such a toolbox. Typical UHF RFID systems with an antenna covering one or several toolbox compartments and positioned outside the compartments cannot detect tags within conductive compartments. Additionally, as known by those skilled in the art, radiative UHF RFID waves, generated by standard RFID UHF antennas placed within an electrically conductive cavity, cannot propagate correctly within the cavity, if the volume of the cavity is too small. One of the cavity dimension must be at least three times longer than the UHF wavelength. As the UHF RFID standards are limited in Europe to a narrow band 866-869 MHz and in USA to a narrow band 902-928 MHz, the UHF wavelengths to be considered are about 34 cm in Europe and 32 cm in US. Consequently, standard UHF antennas cannot operate within usual metallic toolboxes, whose compartments typically have a maximum dimension of about 60 cm, i.e. inferior to 96 cm. Therefore, the tools RFID tags in the toolbox usually cannot be detected in a conductive toolbox with standard RFID systems.

SUMMARY

Approaches described herein provide an Ultra-high Frequency (UHF) radio frequency identification (RFID) system for communicating with RFID tags or transponders within a conductive toolbox and more generally within a small cavity, and overcoming the above drawbacks.

In particular, a UHF RFID device that operates at a UHF wavelength to enable communication with UHF RFID tags positioned within at least one cavity having an internal volume with a largest dimension, may be summarized as being characterized in that said largest dimension is below twice said UHF wavelength. Advantageously, said UHF RFID device comprises a wire wave guide positioned within said at least one cavity above a ground surface and having an entry extremity and at least one exit extremity, wherein said entry extremity is fed by said UHF RFID reader and said at least one exit extremity is connected to said ground surface via a load.

Such usage of a wire wave guide ensures the establishment of an evanescent UHF electromagnetic (EM) propagating wave within a small conductive cavity. The termination of the wire wave guide by a load disperses the EM energy conveyed by the wire wave guide, thus avoiding the establishment of stationary modes and therefore ensuring the establishment of a propagating wave in the small conductive cavity. An additional benefit is that the dispersion of the EM energy in the load prevents reflections, which could damage the RFID reader.

Preferably, the ground surface is the cavity side whose area is the largest and the wire wave guide is positioned along the longest dimension of the cavity.

In a preferred embodiment, the load is a 50 ohm resistor connecting the ground surface with the end of said wire wave guide.

Advantageously, the wire wave guide is composed of a conductive line or of two conductive lines positioned in parallel and wherein the feed line of one of said two conductive lines is a half wave length longer than the feed line of the other conductive line.

Preferably, the two conductive lines are positioned at a distance above said ground surface within the range 2 mm to 4 mm and at a distance from said cavity sides adjacent to said ground surface within the range 2 mm to 4 mm.

In a particular embodiment, the conductive line is composed of two straight conductors made of discontinued conductive segments positioned side by side so that the line discontinuities are distributed alternatively along said two straight conductors and with at the end of each of said two straight conductors an end segment whose length is half the length of the other said segments.

According to another feature, the conductive line is a micro-strip made of copper or aluminum lines drawn on an insulating support.

Additionally or alternatively, a UHF RFID device to monitor UHF RFID tags in one or more cavities, may be summarized as comprising a UHF RFID reader to feed via a directional coupler the entry extremity of the wire wave guide and a same number of UHF RFID devices as the number of said one or more cavities.

Additionally or alternatively, a toolbox can be summarized as comprising a plurality of compartments, the bottom of which forms a ground surface, wherein each compartment comprises a UHF RFID device and the UHF RFID reader is external to the toolbox and is configured with a coaxial cable adapted to be connected onto a BNC connector, which is connected to said directional coupler installed in the toolbox.

Additionally or alternatively, a method for enabling communication of an UHF RFID reader with UHF RFID tags operating at a UHF wavelength and positioned within at least one cavity, whose largest dimension is below twice said UHF wavelength, may be summarized as comprising: positioning within said at least one cavity above a ground surface a wire wave guide having an entry extremity and at least one exit extremity, wherein said wire wave guide is configured to generate a propagative non-radiating UHF electromagnetic wave within said at least one cavity and wherein said entry extremity of said wire wave guide is fed by said UHF RFID reader and said at least one exit extremity of said wire wave guide is connected to said ground surface via a load, and reading the information of said UHF RFID tags.

In a particular embodiment, for each of said cavities inside said container one of the sides of said cavity is conductive and serves as a ground surface.

One particular advantage is that, in the case of a conductive cavity, the UHF EM wave is confined within the cavity, thus avoiding any leakage and therefore preventing from any detection and communication with UHF RFID tags, which would lie outside the cavity.

BRIEF DESCRIPTION OF THE DRAWINGS

Other aspects, features and advantages of the present teachings will become clearer to those ordinary skilled in the art upon review of the following description in conjunction with the accompanying drawings where.

DETAILED DESCRIPTION

The RFID system of the invention comprises a reader and one or several UHF RFID devices, and generates a RFID signal via the RFID device and receives via the same UHF RFID device responses from the RFID tag attached to a tool, which needs to be detected. In principle, either LF/HF RFID or UHF RFID technologies could be used. However, UHF RFID technology is preferred because of the following issues inherent to LF/HF RFID technology. LF/HF inductive loop antennas are heavier and more expensive than UHF antennas, and do not work properly on or near conductive surfaces (both for the RFID tag and the RFID reader). LF/HF RFID technology requires additional magnetic spacer or coating (such as ferrite) to canalize the magnetic field, which implies a complex and expensive implementation. The LF/HF alternative magnetic field induces eddy currents in the toolbox walls, generating energy losses and heat in the toolbox, resulting in additional cost for the system to evacuate this energy. Typical, toolboxes comprise several tools compartments, whose size are usually about: 20 cm×15 cm×40 cm or smaller.

According to the invention, the design of the UHF RFID device for communicating with UHF RFID tags within a conductive toolbox compartment is based on the integration of a conductive line. The conductive line is positioned within the toolbox compartment near and along one of the toolbox compartment sides. Preferably, the conductive line is positioned along the longest dimension of the toolbox compartment and near the toolbox compartment side whose area is the largest. In the case of a parallelepipedic compartment, which is the typical geometry of a toolbox compartment, the conductive line is positioned near the largest rectangular side of the toolbox compartment, which generally is the bottom wall of the toolbox compartment. The conductive line is connected to this nearest side of the conductive toolbox compartment, which serves as a ground surface. The conductive line behaves as a wire wave guide, which generates a localized propagating electromagnetic (EM) field in the vicinity of the conductive line. The electric field lines are directed from the conductive line towards the ground surface. The introduction of a conductive line within the conductive toolbox compartment as described above ensures the propagation of a non-radiative evanescent UHF EM wave along the conductive line within the toolbox compartment.

Figure 1:
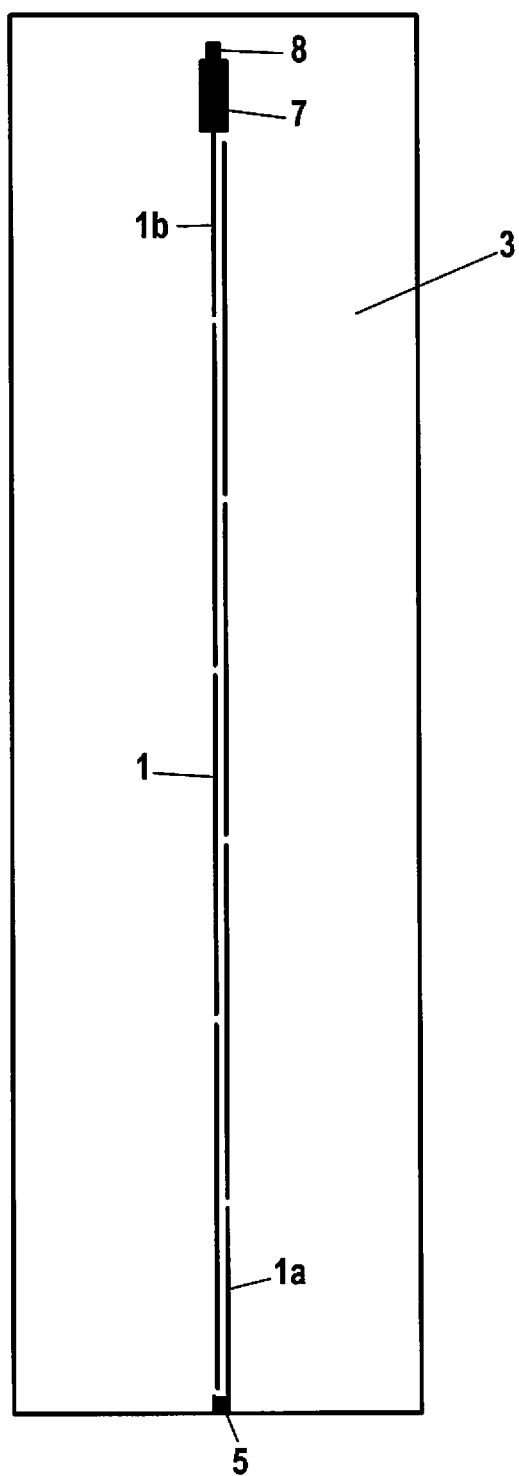
FIG. 1 represents a wire wave guide including a single conductive line composed of two straight conductors made of discontinued conductive segments.

Any conductive line shape could be used as a wire wave guide to generate a non-radiative propagating evanescent EM field, including a serpentine shape. The main limitation for the shape of the wire wave guide is the impact of piling several metallic tools within the toolbox compartment, which may detune the UHF RFID system. For design and industrial simplicity, a straight conductor shape is preferred for the conductive line. Preferably, the conductive line is composed of two straight conductors made of discontinued conductive segments positioned side by side so that the line discontinuities are distributed alternatively along the two straight conductors as illustrated on FIG. 1. Each straight conductor composing the conductive line 1 of the wire wave guide includes at its extremity an end segment 1a or 1b whose length is half the length of the other segments in order to ensure the alternation of the discontinuities respectively along each of the two straight conductors. The end segments 1a and 1b can also be positioned at the two extremities of only one of the two straight conductors. Such a structure improves the conductive line efficiency and ensures the re-phasing of the line. In the case of the UHF RFID band for Europe, the length of each segment is within the range 42 mm to 46 mm and preferably: 44 mm and the length of the line discontinuities is preferably 1 mm. Preferably, the conductive line is made of copper or aluminum. In a preferred embodiment, micro-strip technology is used for manufacturing the wire wave guide, i.e. the electrical transmission lines are fabricated using printed circuit board technology. Typically, copper lines are drawn on insulating supports such as composite epoxy materials or laminates made of layers of cloth or paper with thermo-set resin. The thickness of the micro-strip support is within the range 0.5 mm to 2 mm and preferably: 1.6 mm. The conductive line 1 is held inside the conductive toolbox compartment above a conductive surface 3 of the toolbox compartment at a distance within the range 2 mm to 4 mm and preferably: 3 mm. Generally, the conductive surface 3, which serves as a ground surface is the bottom side of a toolbox compartment. Preferably, the conductive line 1 is centered above the conductive surface 3 along the longest dimension of the conductive surface 3.

In order to avoid reflections of the propagating wave, the conductive line, which is fed directly via a current input 5, is terminated by a load 7. This load disperses the electromagnetic energy conveyed by the conductive line, and thus avoids the establishment of stationary modes along the conductive line. If stationary waves were established, the resulting EM field would not be appropriate for communicating with RFID tags as the EM field profile would include peaks and valleys (i.e. nodes). RFID tags positioned at a node would be unlikely to be detected in general. The establishment of a propagating wave avoids the nodes of a stationary wave, and ensures that UHF RFID tags can be detected anywhere along the conductive line. Moreover, the reflections, which are at the origin of the stationary waves, could deteriorate the UHF RFID reader. The addition of a load at the end of the wire wave guide prevents reflections, which could damage the UHF RFID reader. In a preferred embodiment, the UHF RFID signal generated by the reader is fed via the current input 5 into an entry extremity of the conductive line 1. The connection of the current input 5 on the entry extremity of the conductive line 1 is performed on the entry end segment 1a of the conductive line 1 as represented on FIG. 2. The load 7 is connected for one of its electrical terminations to the exit extremity of the conductive line 1, which is the extremity opposite to the entry extremity of the conductive line 1. The connection of the load 7 on the exit extremity of the conductive line 1 is performed on the exit end segment 1b of the conductive line 1.

The load 7 is connected for its other electrical termination 8 to the conductive surface 3, which serves as a ground surface. Preferably, a load of 50 ohm connects the end of the conductive line with the ground surface.

It can be noted that the conductive walls of the toolbox compartment could constitute a cavity waveguide with a rectangular section. However, radiative UHF RFID waves, generated by standard RFID UHF antennas, cannot propagate correctly within a confined space defined by conductive external walls of a cavity if the volume of the cavity is too small. For UHF RFID radiative waves to propagate efficiently, the confining conductive cavity must have a section, whose sides' dimensions are at least longer than the UHF wavelength, and a length at least three times longer than the UHF wavelength, i.e. approximately a section of about at least 30 cm×30 cm, and a length about at least 100 cm. The establishment of a radiative UHF RFID wave within the volume of the conductive cavity results from constructive reflections of the EM waves on the walls of the cavity. In practice, the establishment of a radiative UHF EM wave within a conductive toolbox compartment is only efficient in the case of a resonating cavity tuned for the operating wavelength, which corresponds to the establishment of stationary EM waves. As the UHF RFID standards are limited in Europe to a narrow band 866-869 MHz and in USA to a narrow band 902-928 MHz, the possible dimensions of a resonating conductive toolbox compartment are very limited. Therefore, the properties of UHF cavity waveguides with a rectangular section cannot be used for toolboxes, nor more generally for small conductive cavities. The UHF RFID system of the invention is designed for operating within a conductive toolbox, and more generally within a conductive cavity, whose maximum dimension is below twice the UHF wavelength. For usual toolboxes, the maximum dimension of a toolbox compartment is typically its length, with a maximum value of about 60 cm, where, in Europe for UHF RFID systems, the operational wavelength is about 34 cm, and in US for UHF RFID systems, the operational wavelength is about 32 cm.

Figure 2:
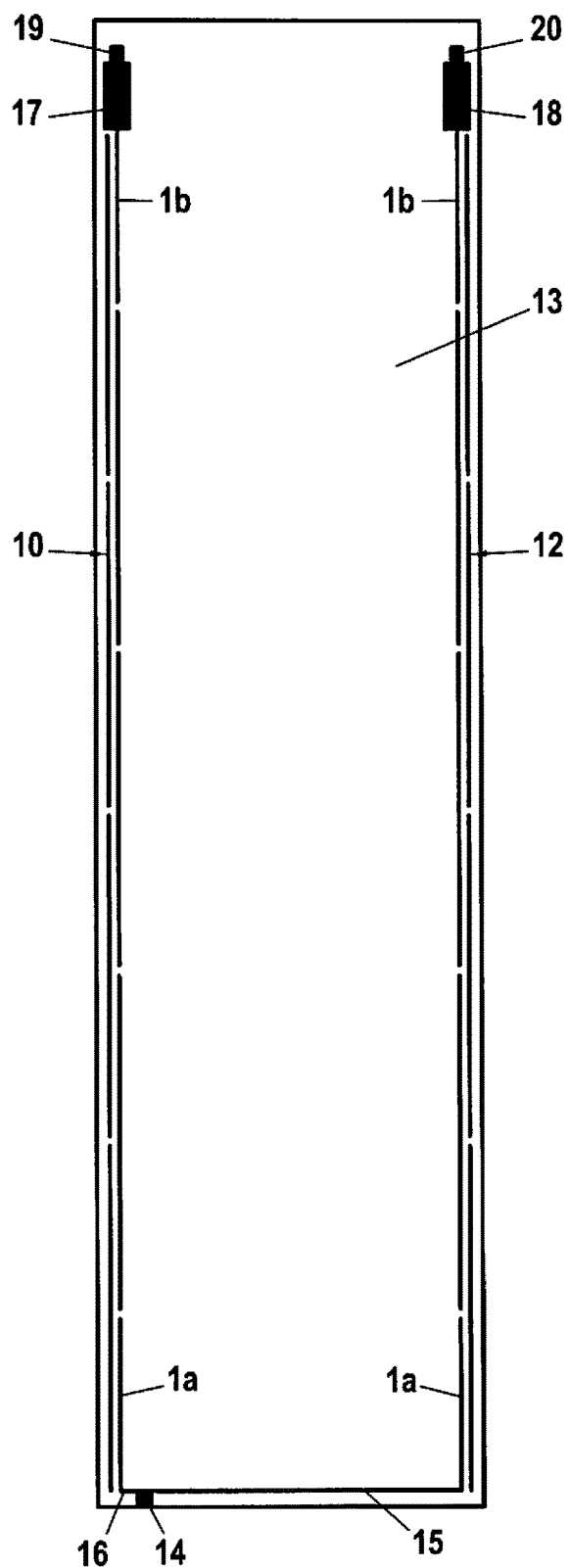
FIG. 2 represents a wire wave guide composed of two conductive lines positioned in parallel above a conductive surface.

As illustrated on FIG. 2, the efficiency of the wire wave guide system is improved by using two conductive lines 10, 12 positioned in parallel above a conductive surface 13, which is one of the surfaces of the toolbox compartment. These two conductive lines are fed via a current input 14. Each conductive lines 10 or 12 is composed of two straight conductors of discontinued conductive segments positioned side by side with discontinuities distributed alternatively along the two straight conductors and with at the extremities of each straight conductor an end segment 1a and 1b whose length is half the length of the other segments. This system of two parallel conductive lines is designed so that the current in the two conductive lines are in phase opposition, resulting in a constructive addition of the evanescent EM fields of the two conductive lines in the volume between these two conductive lines 10 and 12 above the conductive surface 13. The phase opposition is obtained by feeding the second conductive line 12 via a feed line 15, which is a half wavelength longer than the feed line 16 of the first conductive line 10. This half wavelength additional length inverts the current phase in the second conductive line 12 compared to the current phase in the first conductive line 10. Thanks to this inversion, the evanescent EM fields generated by the two wire wave guides 10 and 12 are constructively added. The resulting evanescent EM field of these two parallel conductive lines is about twice more intense than the evanescent EM field generated by a single conductive line. Preferably, the conductive lines are made of copper or aluminum. In a preferred embodiment, in a similar manner as for the single conductive line wire wave guide described above, the conductive lines are manufactured using microstrip technology.

In order to avoid reflections of the propagating wave in the toolbox compartment, each conductive line 10 or 12 is terminated by a load 17 or 18. These loads disperse the electromagnetic energy conveyed by the wire wave guide, and thus avoid the establishment of stationary modes within the toolbox compartment, as well as prevent reflections, which could damage the UHF RFID reader. In a preferred embodiment, the feed lines 15 and 16 are fed with the UHF RFID signal generated by the reader via the current input 14 into an entry extremity of the wire wave guide. The connection of the current input 14 on the entry extremity of the wire wave guide is performed on one extremity of the feed line 15 or 16. The other extremity of each feed line 15 or 16 is connected to the end segment 1a of the conductive line 10 or 12. Each load 17 or 18 is connected for one of its electrical terminations to the exit extremity of the conductive line 10 or 12 on the two end segments 1b, which are the conductive lines extremities opposite to the entry extremity of the wire wave guide. Each load 17 or 18 is connected on its other electrical termination 19 or 20 to the conductive surface 13, which serves as a ground surface. Preferably, a load of 50 ohm connects the end of the wire wave guide with the ground surface of the toolbox compartment. In the particular case of the wire wave guide composed of two conductive lines, each conductive line is ended by a 100 ohm resistor load connected to the ground surface of the toolbox compartment.

Figure 3:
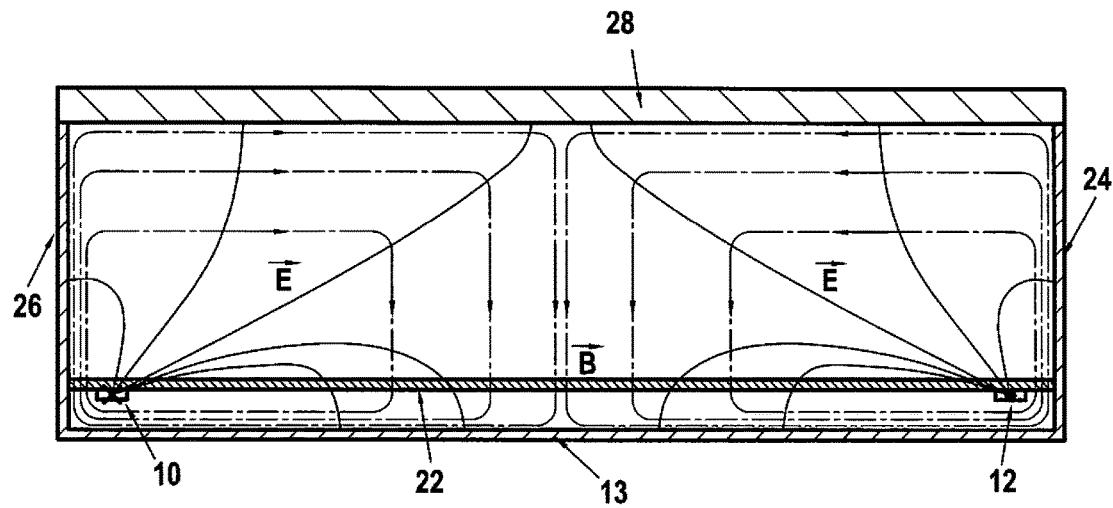
FIG. 3 illustrates the electromagnetic field generated by two parallel conductive lines within a cavity with a rectangular section.

FIG. 3 illustrates the electromagnetic fields generated by the two parallel conductive lines 10 and 12 within a conductive toolbox compartment with a rectangular section. The two conductive lines 10 and 12 are held by a non-conductive plate 22 so that they are positioned above the conductive surface 13 of the toolbox compartment at a distance within the range 2 mm to 4 mm and preferably: 3 mm. Typically, the conductive surface 13 is the bottom wall of a toolbox compartment. Each conductive line 10 or 12 is positioned on the non-conductive plate 22 so that they are positioned from the conductive sides of the toolbox compartment respectively 24 or 26 at a distance within the range 2 mm to 4 mm and preferably: 3 mm. Typically, the conductive surfaces 24 and 26 are the sides of a toolbox compartment having a top surface 28. The distance between the two parallel conductive lines is within the range 10 mm to 300 mm. Due to the designed configuration described above, the resulting evanescent EM field generated by the two conductive lines is established into the toolbox compartment and interacts with the conductive surfaces of the toolbox compartment so that the magnetic field B is primarily in a direction perpendicular to the plane defined by the two parallel conductive lines 10 and 12. The currents in the conductive lines 10 and 12 are in phase opposition, and are conventionally represented by a dot (.) and a cross (x) on FIG. 3.

For typical UHF RFID readers currently available on the market with power output in the range 1 W to 4 W, communication with typical UHF RFID tags currently available on the market can be established within a distance of about 10 cm to 15 cm from a single conductive line composed of two straight conductors made of discontinued conductive segments as described above. A configuration with two conductive lines positioned in parallel as described above can be used with toolbox compartments whose section (height×width) can be up to 30 cm×15 cm. The length of the toolbox compartment can be up to about 100 cm before EM energy loss along the wire wave guide is too important. So, for the narrow bands of 866-869 MHz in Europe or 902-928 MHz in USA, which correspond to wavelength about 34 cm in Europe or 32 cm in USA, the invention allows for the propagation of an evanescent UHF EM wave and the communication with UHF RFID tags within conductive toolbox compartments whose length is up to three wavelengths, whose width is up to one wavelength and whose height is up to half a wavelength. The above characteristics are not limited to toolbox compartments, and it is to be understood that the invention can be applied to any conductive cavity for which the wire wave guide is preferably positioned along the longest dimension of the cavity and near the cavity's side whose area is the largest. The invention also applies both to active RFID tags, which are battery-assisted, or to passive RFID tags, although passive RFID tags would be preferred as they are lower cost and smaller because they have no battery.

Figure 4:
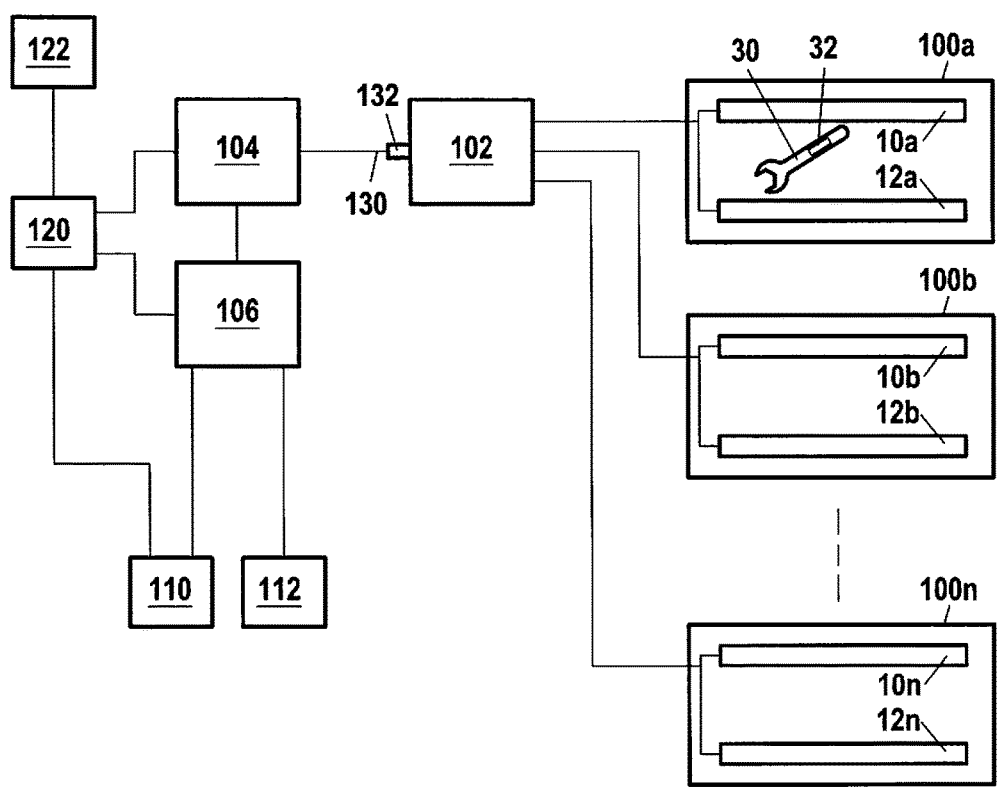
FIG. 4 represents a UHF RFID system for a toolbox with several compartments.

FIG. 4 represents a UHF RFID system for a conductive toolbox, typically a metal toolbox, with several compartments where UHF RFID tags 30 of tools 32 need to be detected and need to communicate with the UHF RFID reader. In each of the compartments 100a to 100n of the toolbox, a wire wave guide composed of a combination of two parallel conductive lines 10a and 12a to 10n and 12n is installed above the bottom wall of each toolbox compartment. This bottom wall is used as the ground surface for the localized EM field. Each conductive line of the wire wave guide is positioned next to one of two parallel walls of the toolbox compartment. The wire wave guide is made of copper lines, which are drawn on a 1.6 mm thick epoxy insulating support. Each wire wave guide, i.e. each combination of two conductive lines 10n-12n, is connected to a directional coupler 102. A UHF RFID reader 104 is connected to the directional coupler and to a controller 106, which collects the UHF RFID tags data of the tags 32 of the tools 30 detected by the UHF RFID reader and which manages the communication of this data. Preferably, the controller manages some ports such as USB 110 or Bluetooth 112 for communicating the collected RFID data to external management systems. Power is provided to the UHF RFID reader, to the controller and to the USB port by a power supply 120, which is powered by a battery 122. When a toolbox compartment is closed, the UHF EM field generated by the wire wave guide is contained within the conductive toolbox compartment. This containment prevents from parasite signal coming from the exterior of the toolbox (for example from tagged tools left near the toolbox). When the toolbox compartment is opened, the UHF RFID system still continues to work correctly because the UHF EM radiation generated by the wire wave guide is essentially a near field radiation. The EM radiation leaking outside the compartment is limited, and detuning of the UHF RFID system due to the opening of the toolbox compartment is limited.

The system represented in FIG. 4 can be used for tracking and tracing and inventory for items stored in toolboxes. Such a system can be implemented according to the two main following models. In a first model, a UHF RFID reader with its associated controls and power supply is embedded in each toolbox. Such a communicating active toolbox allows for automatic continuous inventory, but carries a high cost due to the embedding of some costly electronics in each toolbox. In a low cost model, the toolbox is passive and embeds only the wire wave guides and the directional coupler 102. A mobile UHF RFID reader and its associated controls is connected to the toolbox only when needed for checking which tools are in the toolbox. In the exemplary embodiment of FIG. 4, the connection of the mobile UHF RFID reader to the toolbox is performed via a coaxial cable 130 manually connected onto a BNC connector 132, which is attached on an external wall of the toolbox and which is connected to the directional coupler 102 installed in the toolbox. Although the system represented in FIG. 4 has been designed for toolboxes, it is to be understood that the usage of such a system is not limited to toolboxes, but can be applied to any containing system, mobile or immobile, storing items in relatively small conductive cavities.

More generally, although the embodiments of the invention have been described in the case of conductive cavities and more particularly for conductive toolboxes, it is to be understood that the invention is not limited to the disclosed embodiments. The invention can also be applied to non-conductive cavities, and in particular to toolboxes with non-conductive walls as will be explained below. For a non-conductive toolbox, one wall side in each compartment of the toolbox would have to be at least partially coated or dressed with a conductive material in order to serve as a ground surface for the wire wave guide. Preferably, the largest wall of the toolbox compartment is used as the ground surface—conveniently, this is generally the bottom wall of the toolbox compartment. The UHF EM field generated by the wire wave guide remains primarily localized near the wire wave guide, radiating from the conductive lines of the wire wave guide towards the ground surface. Thus, the EM radiation leaking outside the compartment is limited and tagged tools left near the toolbox are typically not detected. Preferably, the other walls of the toolbox compartment are also covered with conductive materials so that the interaction of the wire wave guide with the compartment side walls confines the UHF EM generated by the wire wave guide within the toolbox compartment.

The invention claimed is:

1. A UHF radiofrequency identification (RFID) device operating at an Ultra-High Frequency (UHF) wavelength to enable communication of a UHF radio frequency identification (RFID) reader with a number of UHF RFID tags positioned within at least one cavity of a container or a toolbox having an internal volume with a largest dimension, wherein said largest dimension is below twice said UHF wavelength and wherein said UHF RFID device comprises a wire wave guide positioned above a ground surface within said at least one cavity, configured to generate a propagative non-radiating UHF electromagnetic wave within said at least one cavity and having an entry extremity and at least one exit extremity, wherein said entry extremity is fed by said UHF RFID reader and said at least one exit extremity is connected to said ground surface via a load.

2. The UHF RFID device according to claim 1, wherein said ground surface is a cavity side whose area is the largest.

3. The UHF RFID device according to claim 1, wherein said wire wave guide is positioned along a longest dimension of the cavity.

4. The UHF RFID device according to claim 1, wherein said load is a 50 ohm resistor.

5. The UHF RFID device according to claim 1, wherein said wire wave guide is composed of a conductive line.

6. The UHF RFID device according to claim 1, wherein said wire wave guide is composed of two conductive lines positioned in parallel and wherein a feed line of one of said two conductive lines is a half wave length longer than a feed line of the other conductive line.

7. The UHF RFID device according to claim 6, wherein each of said two conductive lines are positioned at a distance above said ground surface within the range 2 mm to 4 mm and at a distance from cavity sides adjacent to said ground surface within the range 2 mm to 4 mm.

8. The UHF RFID device according to claim 1, wherein said conductive line is composed of two straight conductors made of discontinued conductive segments positioned side by side so that the line discontinuities are distributed alternatively along said two straight conductors and with at the extremity of each of said two straight conductors an end segment whose length is half the length of the other said segments.

9. The UHF RFID device according to claim 1, wherein said conductive line is a micro-strip made of copper or aluminum lines drawn on an insulating support.

10. The UHF RFID device according to claim 1, wherein said entry extremity of said wire wave guide is fed by said UHF RFID reader via a directional coupler, which is connected to a same number of UHF RFID devices as a number of said at least one cavity.

11. A toolbox with a plurality of compartments, the bottom of which forms a ground surface, wherein each compartment comprises a respective Ultra-High Frequency (UHF) radio frequency identification (RFID) device, the UHF RFID devices which operate at an UHF wavelength to enable communication of a UHF RFID reader with UHF RFID tags positioned within at least one cavity of a container or a toolbox having an internal volume with a largest dimension, wherein said largest dimension is below twice said UHF wavelength and wherein said UHF RFID device comprises a wire wave guide positioned above a ground surface within said at least one cavity, configured to generate a propagative non-radiating UHF electromagnetic wave within said at least one cavity and having an entry extremity and at least one exit extremity, wherein said entry extremity is fed by said UHF RFID reader and said at least one exit extremity is connected to said ground surface via a load.

12. The toolbox of claim 11, wherein the UHF RFID reader is external to the toolbox and is configured with a coaxial cable adapted to be connected onto a BNC connector, which is connected to said directional coupler installed in the toolbox.

13. A method for enabling communication of an Ultra-High Frequency (UHF) radio frequency identification (RFID) reader with UHF RFID tags operating at an UHF wavelength and positioned within at least one cavity of a container or a toolbox, whose largest dimension is below twice said UHF wavelength, comprising: positioning within said at least one cavity above a ground surface a wire wave guide having an entry extremity and at least one exit extremity, wherein said wire wave guide is configured to generate a propagative non-radiating UHF electromagnetic wave within said at least one cavity and wherein said entry extremity of said wire wave guide is fed by said UHF RFID reader and said at least one exit extremity of said wire wave guide is connected to said ground surface via a load, and reading the information of said UHF RFID tags.

14. The method as claimed in claim 13, wherein said ground surface is formed by one of the conductive sides of each of said at least one cavity.

* * * * *